United States Patent [19]

Kanduth et al.

[11] Patent Number: 5,757,473
[45] Date of Patent: May 26, 1998

[54] OPTICAL STRAIN SENSOR FOR THE MEASUREMENT OF MICRODEFORMATIONS OF SURFACES

[75] Inventors: Harald Kanduth, St. Lazare; Denis Jacob, Kirkland; Christian Renaud, Sainte-Dorothée; Michel Cantin, St-Hubert; Alain Coulombe, Brossard, all of Canada

[73] Assignee: Noranda, Inc., Toronto, Canada

[21] Appl. No.: 748,956

[22] Filed: Nov. 13, 1996

[51] Int. Cl.⁶ ................................................ G01B 11/16
[52] U.S. Cl. ................................................ 356/32
[58] Field of Search .............................. 356/32; 382/108; 364/508; 73/800

[56] References Cited

U.S. PATENT DOCUMENTS

| | | |
|---|---|---|
| 3,567,320 | 3/1971 | Chitayat . |
| 3,671,126 | 6/1972 | Erb . |
| 3,948,090 | 4/1976 | Berman et al. ............... 73/789 |
| 3,992,095 | 11/1976 | Jacoby et al. ............... 356/32 |
| 4,163,397 | 8/1979 | Harmer ............... 73/800 |
| 4,204,772 | 5/1980 | Balasubramanian ............... 356/376 |
| 4,837,615 | 6/1989 | Boshier ............... 358/100 |
| 5,065,331 | 11/1991 | Vachon et al. ............... 364/508 |
| 5,325,443 | 6/1994 | Beatty et al. . |
| 5,384,717 | 1/1995 | Ebenstein ............... 364/560 |
| 5,410,410 | 4/1995 | Yamazaki et al. ............... 356/376 |

FOREIGN PATENT DOCUMENTS

| | | | |
|---|---|---|---|
| 0 255 300 | 2/1988 | European Pat. Off. | G01B 11/12 |
| 0 322 314 | 6/1989 | European Pat. Off. | G01B 11/00 |

OTHER PUBLICATIONS

Das et al., *Can. Geotech. J., 1995*, vol. 32, pp. 166–171, "Brazilian Tensile Strength Test of Lightly Cemented Sand."

*Primary Examiner*—Frank G. Font
*Assistant Examiner*—Amanda Merlino
*Attorney, Agent, or Firm*—Fitzpatrick, Cella, Harper & Scinto

[57] ABSTRACT

An optical strain sensor for measuring microdeformations of a surface with a resolution of at least 0.2 microns. The sensor comprises at least one camera for taking photographs of areas of the surface, the photographs being separated by a known fixed distance from one another before deformation has occurred. Templates are selected on the photographs taken before deformation, relocalized on photographs taken after deformation of the surface, and the deformation is derived from the computation of the difference in distances between the templates before and after deformation has occurred.

24 Claims, 2 Drawing Sheets

OPTICAL STRAIN SENSOR FOR THE MEASUREMENT OF MICRODEFORMATIONS OF SURFACES

FIELD OF THE INVENTION

The present invention is concerned with an optical strain measurement device for the measurement of microdeformations with a resolution of at least 0.2 microns. The invention is also concerned with the application of the optical strain measurement principle to instrumentation for materials testing as well as stress measurement in mining and civil engineering.

BACKGROUND OF THE INVENTION

In the field of materials testing, mining and civil engineering, measurements of microdeformations generally rely on electrical strain gauges. The gauges work on the principle of change of resistance of an electrical wire as a function of minute deformations in its length, which is measured and used to infer the deformation as microstrains. In general, these devices are sturdy, relatively precise, reliable and cheap to use. However, the technique has several disadvantages:

the strain gauge must be in contact with the surface to be measured. This is usually accomplished by gluing on or pressing the gauge against the surface where measurements are taking place. This causes problems such as:

when glue is used, there is often debonding of the gauge in hostile environments, or when proper precautions have not been taken in its installation, or when there are large deformations. In addition, the hysteresis of the glue layer between the surface and the gauge may falsify the degree of deformation; and when the gauge is pressed against the surface in the case of, for example, friction gauges, one of the problems is that if the pressure is too weak, slippage and nonconformity of the gauge with respect to the deformation of the surface will occur. When the pressure is increased, it may influence the deformation of the surface as well as that of the gauge;

if temperature changes occur, the calibration of the gauge is affected because the length of the wire comprising the gauge varies, thus causing changes in the electrical resistivity in the wire. Several methods exist to compensate for these effects, but they are elaborate and not practical in many applications;

because the deformation is measured in the millivolt range, the system is very sensitive to moisture, inductive noise, poor electrical connections (connectors have to be made of gold) and other connecting interferences; and in long-term installations or in situations of large deformations, the electrical wire gauge and/or the glue are subject to creep, which will falsify the readings or render the gauge useless.

Electro-optical strain gauges represent an alternative to electrical strain gauges. Although there is limited use of these types of strain gauges in materials testing, mining and civil engineering, there is a large body of expertise available in this field. There are many techniques and types of optical strain gauges used in a variety of applications, most of which utilize some type of coherent light and various effects of interference in response to deformations. As for electrical strain gauges, it is a requisite that the electro-optical gauge be in contact with the surface to be measured. Consequently, all the disadvantages and problems related to contact with the surface listed previously apply to electro-optical strain gauges.

Vibrating wire strain gauges are used to measure directly changes in stress. They work on the principle of the measurement of the change of frequency of a mechanically or electrically plucked pretensioned wire in response to changes in the pressure acting on the housing within which the wire is installed. The technique is discussed by Franklin J. in Mine Monitoring Manual, The Canadian Institute of Mining and Metallurgy, Special Volume 42, 1990, p. 104–106. Its application is mainly in long-term monitoring of stress changes in structures and cannot be used to measure directly dimensional changes on surfaces.

There have been methods proposed relying on the principle of noncontact measurement of microdeformations which obviate the need of contact with the measured surface. These methods can be broadly classified into three categories, namely speckle pattern interferometry, laser holography, and optical image analysis techniques.

Speckle pattern interferometry rests on the principle that when a coherent radiation is reflected from, or is transmitted by, a diffusing surface or medium, the resulting image takes on a speckled appearance. Speckle patterns are caused by mutual interference of the coherent radiation because of the optical roughness of the surface or medium, and have a real existence which can be photographed or recorded. When two such photographs or recordings are made of a surface or medium before and after some deformation has taken place, the speckle pattern of the second image is different from the first one. When the two images are superimposed and the speckle pattern of the first image is subtracted from that of the second image, either optically or electronically, the result is a series of fringes from which the amount and direction of deformation can be calculated. Speckle pattern interferometry could meet the required precision for the measurement of microdeformations, for example in the field of materials testing, mining and civil engineering. However, the method requires that the optical device be maintained at the same precise location between recording the two images, which therefore renders this technology hardly usable for many potential applications.

As the name implies, laser holography produces a hologram of the surface to undergo deformation by projecting a laser beam directly, and a reference beam indirectly, onto the surface so that a holographic image of the surface is generated. After the deformation has taken place, a second hologram of the surface is produced and the two holograms are superimposed. As for the speckle pattern method, the reference hologram is subtracted from the second hologram, thus creating interference fringes representative of the deformation the surface has undergone. Also, as for speckle pattern interferometry, laser holography requires precise positioning of the device for the two images, which makes this technology of very limited use.

The method most closely related to the present invention uses an optical image analysis technique. Das et. al. in the Can. Geotech J.; 1995, 32,166–171 report on the application of such a method to measure deformations in test specimens under loading conditions. One of the methods known to determine the tensile strength of engineering materials is the Brazilian test, where a cylindrical specimen of the test material is placed horizontally in a press and is subjected to loads until the specimen fails diametrically in the direction of the applied load. However, in the reported work, it was also of interest to determine the diametral deformation of the test specimen as the load was applied. To make this measurement, the authors employed an optical image analysis method. Before placing the specimen under the press, a grid of reference points of approximately 0.9 mm diameter each is applied by means of spray paint onto one of the ends of the test specimen. An optical long-distance microscope is placed at a distance of 300 mm from the end of the specimen containing the reference points to obtain a magnified view of an area of 11.16 mm×10.43 mm of the surface at the centre of the specimen end. Adjustments are made to the microscope to ensure its position normal to the end surface as well as to bring the surface into focus. The microscope is attached to a charge couple device (CCD) camera in which there is a grid of 480 horizontal lines each consisting of 512 photonic sensors, also known as pixels. The optical characteristics of the 11.16 mm×10.43 mm image are sensed by the photonic sensor array and are sent through a frame grabber to a computer. The digital signals are then translated into an image file for analysis via commercial interactive image analysis software. Before making any measurements, a calibration is made to obtain the scale factor relating the distances measured on the digitized image on the computer screen to that on the actual test specimen. For any given image, corresponding to a given load, the tensile deformation, or strain, along the diameter of the specimen at right angles to the load is obtained by measuring the distance between two grid points located at equal distance from the centre of the end surface of the specimen and approximately 9 mm apart from one another, representing a strain gauge length of 9 mm. The measurement is done on the computer screen using the interactive image analysis software.

Given the fact that some commercial image analysis softwares are capable of resolving each photonic pixel into eight components, and that a photonic sensor grid containing 512 pixels per line is used for the measurement, the 11.16 mm×10.43 mm (11 160 µm×10 430 µm) image is resolved into 480 lines of 4096 data points each. This represents a linear resolution of approximately 2.7 microns per pixel along the length of the image. When expressed as deformation $\Delta L/L$, that is, difference in length measured/total length of the strain gauge of 9000 microns, the resolution at each end of the strain gauge is 0.0003 strains (2.7/9000) or 300 microstrains (0.0003×1,000,000). The resolution is therefore (2×300) 600 microstrains for a strain gauge length of 9 mm. Although this resolution appears to be adequate for the particular tests carried out by Das et. al., it falls far short of the resolution required for most applications in the field of civil and mining engineering. For example, in the determination of elastic properties of rocks, or in the determination of stresses in rock formations, a strain gauge resolution of 20 microstrains or less is required, which is 30 times that of the above system. The resolution of the strain measurement as reported by Das et. al. supra could be improved by, for example, using a photonic sensor with 30 times more pixels, but at the present time such a sensor does not exist. Also, even if such a device would be technically feasible, under the current state of the art it would have to be of very large dimensions and would be unusable in most applications.

In view of the difficulties and limitations associated with conventional methods, there is therefore a great need to develop a robust and versatile strain sensor for measuring microdeformations which does not rely on contact of the sensor with the surface to be measured. Such sensors should be capable of being operated effectively and easily in almost any environment or weather conditions, both under and above ground.

SUMMARY OF THE INVENTION

In accordance with the present invention, there is now provided an optical strain sensor for the measurement of microdeformations of a surface. More specifically, the optical strain sensor comprises:

a camera for taking a photograph of at least two images of an area of the surface before and after deformation has occurred, the images being separated from each other by a known distance before the deformation has occurred;

optical means adjacent to the end of the objective of the camera for allowing the camera to photograph the at least two images of the area or at least one simultaneous split image of the area;

computing means coupled to the camera for digitizing and storing each photograph, the computing means
  i) selecting on display means with an interactive image analysis software, at least one template on the photograph of each image taken before deformation occurs;
  ii) computing the distance between the templates;
  iii) searching for the templates on the photographs of each image taken after deformation has occurred;
  iv) computing the new distance between the templates; and
  v) deriving the deformation by dividing the difference in distance between the templates by the total distance between the templates.

The optical means can be an arrangement of mirrors or lenses, or one or more prisms. Further, the optical means are such that simultaneous split images or sequential full resolution images are photographed by the camera.

In another aspect of the present invention, the optical strain sensor comprises:

at least two cameras installed at a known fixed distance from each other for taking photographs of areas of the surface before and after deformation has occurred;

computing means coupled to the cameras for digitizing and storing each photograph, the computing means
  i) selecting on display means with an interactive image analysis software, at least one template on each of the photographs taken before deformation occurs;
  ii) computing the distance between the templates;
  iii) searching for the templates on each of the photographs taken after deformation has occurred;
  iv) computing the new distance between the templates; and
  v) deriving the deformation by dividing the difference in distance between the templates by the total distance between the templates.

The present invention is also concerned with a method for the measurement of microdeformations of a surface comprising the steps of:
a) obtaining, with at least one camera, a first set of photographs of at least two images or at least one simultaneous split image of an area of the surface, the images being separated by a known fixed distance from each other before deformation of the surface occurs;
b) digitizing and storing the photographs in a computer;
c) repeating step a) after deformation of the surface has occurred to obtain a second set of photographs;
d) selecting one template on each of the first photographs;
e) computing the distance between the templates;
f) searching for the templates on each of the second photographs;
g) computing the distance between the templates in the second photographs; and
h) deriving the deformation of the surface by dividing the difference in distance between the templates ($\Delta L$) by the total distance (L) between the templates.

In a preferred embodiment, the method comprises the use of at least two cameras at a known fixed distance from each other.

In a further preferred embodiment, the templates are stored as distinct sequence of relative grey scales.

IN THE DRAWINGS

FIG. 3 illustrates the deformation of a rhyolite core sample under load as measured with an electrical strain gauge and an optical strain sensor.

DETAILED DESCRIPTION OF THE INVENTION

Figure 1:
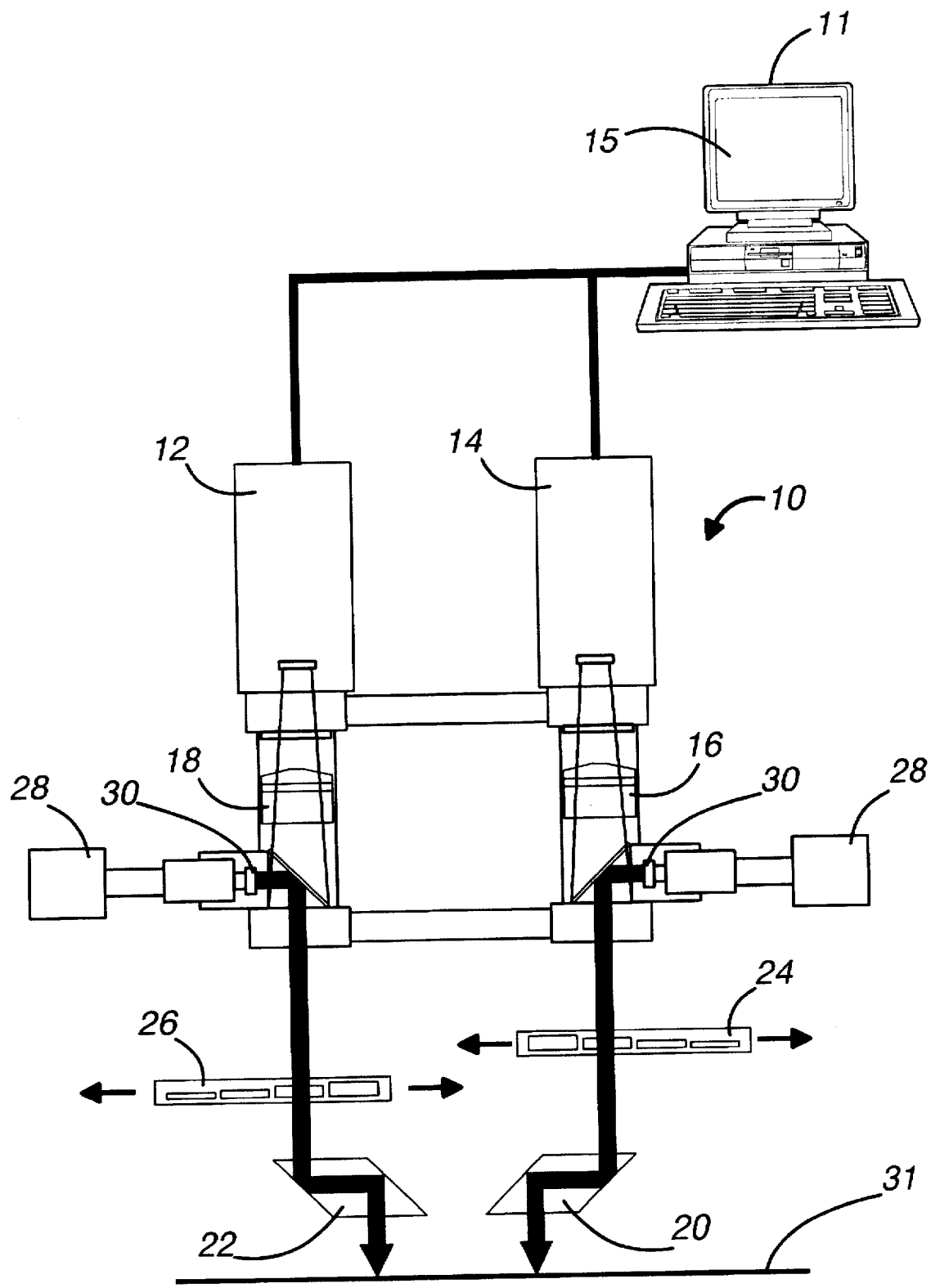
FIG. 1 illustrates an optical strain sensor according to the present invention and containing 2 CCD cameras.

To overcome the limitations and problems associated with the instruments and methods currently available in strain sensing technology for applications in the field of civil and mining engineering, a novel strain sensor has been developed, based on an optical image analysis method, which is capable of a resolution of at least 0.2 microns, and which obviates the need for contact with the surface to be measured. It has been found that the use of at least two images of the surface to be measured allows the measurement of microdeformations with a resolution of 0.2 micron or better, thus equalling, or in some instances surpassing, that of conventional contact methods and instruments with regards to precision, accuracy and applicability.

The present invention obviates the need for contact of the sensor with the surface where measurements are taking place, thus eliminating problems associated therewith and allowing it also to be used in areas previously considered unsuitable. Further, the strain sensor may be moved or removed between measurements, which represents a significant advancement over known technologies.

The operating principle of the present strain sensor is the creation of photographs of at least two images of the surface to be measured before and after deformation, and the determination of the distance between preselected templates on the photographs of each image before and after deformation takes place, and measuring the differences of the distance between these features as a result of the deformation of the surface. Such photographs can be obtained with at least one camera.

The method may be broadly described as follows. Photographs of two or more small images of an area of the surface, the images being separated by a precisely known distance from one another, are obtained by means of one or more conventional charge couple device (CCD) camera including optional suitable optical arrangements such as lenses and prisms that permits the surface to be photographed, preferably at a 12× magnification or higher. When more than one camera is used, the cameras are installed at a fixed distance from each other. The photographs of the surface are digitized and stored in a standard graphics file format in a computer, preferably by means of a frame grabber and suitable commercial software. The subsequent measurement of the deformation involves the selection on the computer screen, by means of interactive image analysis software, of one template on the surface image of each of the reference photographs, that is the photographs before the deformation, computing the distance between the templates, searching for the same templates on the photographs taken after the deformation has occurred and computing the new distance between the templates. The deformation is derived by dividing the difference in distance (ΔL) between the templates by the total distance (L) between the selected templates, and is expressed as microstrains. The number and orientations of strain measurements are determined by the number of cameras used and their spatial relation to one another. For example, two cameras create two photographs and measure a single deformation between the two photographs, three cameras create three photographs and can measure three deformations, four cameras create four photographs which facilitate the measurement of six deformations, etc.

In the case of a sensor having only one camera, in order to generate at least two images separated by a precisely known distance from each other, optical means such as one or more prisms or mirrors are provided adjacent to the objective of the camera to allow the camera to photograph the at least two images of the area or at least one simultaneous split image. Additional optical arrangements such as lenses and prisms used in a sensor having two or more cameras may also be optionally incorporated if necessary.

The search for the selected templates is based on a technique known as template matching. The templates are selected on each of the reference photographs and are stored in the memory of the computer with their respective XY coordinates. The photographs taken after deformation are then scanned for matches with the templates of the reference photographs and when matches are located, the templates' new XY positions are determined. The new XY coordinates are compared with the XY coordinates of the reference photographs and the changes in positions are computed as displacements which, by knowing the original distances between the templates, can be converted into microstrains.

The information contained in the template is stored as a distinct sequence of relative grey scales which is used by the computer to search for the grey scale sequence in the photograph taken after deformation. Since the grey scale sequence is relative, the computer compares only the relative ratios of grey scale sequences of the pixels on the photograph, and thus makes the recognition of features possible even when the subsequent photograph has a different grey intensity because of change in illumination, or has changed in contrast because of a change in focus.

To illustrate the application of the optical deformation measuring principle, the following is an example of how the strain sensor can be used for determining the elastic modulus of a rock sample.

The experiment compares the measurements made with an optical strain sensor according to the present invention with measurements obtained by a standard electrical strain gauge. The strain sensor 10 is illustrated in FIG. 1, and comprises a computer 11 and computer display 15, two black & white CCD cameras 12 and 14 with resolutions of 580 pixels per line ×485 lines and 4.8 mm×3.6 mm detectors coupled to sets of magnifying lens 16 and 18 and optional prism arrangements 20 and 22 respectively so that each camera can photograph an area of 0.4 mm×0.3 mm of the surface to be measured at a 12× magnification, with the photographs being separated by 16 mm from each other. Sets of focal lenses 24 and 26 may optionally be added to the device if necessary Means may also be provided for adjusting the focal length of the camera (not shown).

Figure 2:
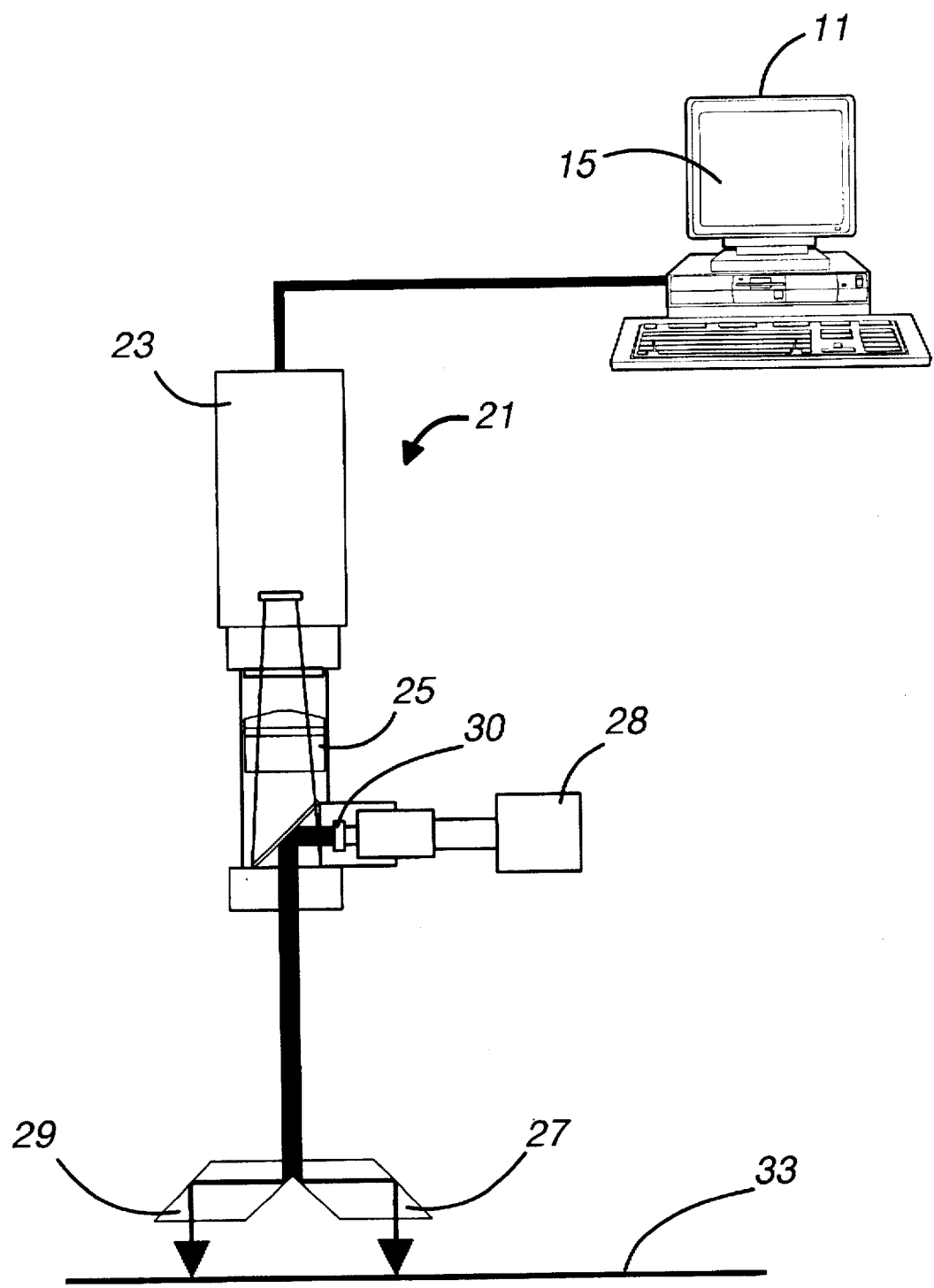
FIG. 2 illustrates an optical strain sensor according to the present invention and containing 1 CCD camera.

In the embodiment of FIG. 2, sensor 21 comprises only one CCD camera 23 coupled to computer 11 and magnifying lenses 25. Two prisms 27 and 29 are located at the end of the objective of camera 23 and divide the image of the surface 33 seen by the camera into two separate images apart from each other at a known distance. It is possible to use a single prism to divide the image in two or more images. Also, the prism could be such that more than two images could be obtained from subdivision, resulting in a corresponding number of images on the display or computer screen. However, a high number of images will reduce the resolution, and may therefore not be suitable. As a preferred embodiment, the prism or mirror adjacent the end of the objective of the camera can be rotated, so that separate, full resolution images of different areas of the suface can be photographed sequentially.

To illustrate the present invention, sensor 10 is mounted in a frame and has at its end a set of clamps (not shown) to clamp the sensor onto a cylindrical core test sample in such a manner that the vertically arranged objectives facilitate the photographic recording of two 0.4 mm×0.3 mm surface areas of the side wall of the cylindrical specimen axially separated by 16 mm from each other. The surface onto which measurements are taken is preferably illuminated by a monochromatic light source 28 for each camera to facilitate the photographic operation. Light filters 30 may optionally be added if required. The photographs are displayed in virtual real time on the computer display where an interactive cursor facilitates the selection of one template on each photograph respectively. The photographs and the template informations, i.e., grey scale sequences and XY coordinates, are then stored in a suitable computer file format for subsequent retrieval. As subsequent photographs are made of the same surface areas, the computer is programmed to search for the previously selected templates on the respective photographs and determine their new XY coordinates, and hence, the new distance between the two templates. By subtracting the new distance between the templates from that of the reference distance, the accurate measurement of the relative displacement (ΔL) of the templates can be computed. Since the actual distance (L) between the two templates is known, the deformation ε in microstrains can be calculated by dividing ΔL by L. The resolution of the sensor illustrated in FIG. 1 can be calculated as follows:
number of pixels per line: 580
resolution per pixel: 8
data points per line: 580×8=4640
length of image: 0.4 mm or 400 microns
resolution of image line: 400 microns/4,640=0.086 microns
gauge length (distance between templates) 16 mm or 16 000 microns
gauge resolution: 0.086 microns×2 templates/16 000 microns=10.75 microstrains The measurement of the elastic modulus of a material like rock involves the placement of a sample, usually in the shape of a cylindrical rod with a length to diameter ratio of about 2:1, in a press and applying pressure onto the sample to effect axial and radial deformation. The deformation, in the range of microstrains, is normally measured by electrical strain gauges attached axially and transversely onto the side of the sample. The amount of deformation at a given load is used to calculate the elastic modulus E and the Poisson's ratio ν of the material. This is an ASTM standard procedure described as D-3148-86 in the ASTM standard test methods.

In the example, the test sample is a diamond drill core of rhyolite having a diameter of 55 mm and a length of 110 mm. A 15-mm electrical strain gauge is glued axially and centrally on the side wall of the core. The test sample is placed in a Tinus Olson press and loaded by increments of 5 000 lbs. from 10 000 to 55 000 lbs. The axial deformation is measured with the electrical strain gauge at each pressure increment, using a Vishay P 3500 electrical strain gauge readout unit. The optical measuring strain sensor of the present invention is also installed on the test sample to photograph an area immediately next to and parallel with the strain gauge. Photographs are therefore recorded between each pressure increment, concurrently with the recording of the deformation measured with the electrical strain gauge. The photographs are digitized, stored in a computer and processed by the method described above after completion of the test. The results are summarized in Table 1.

TABLE 1

Comparison of deformation measurements with the present optical strain sensor and an electrical strain gauge

| Load (lbs.) | Optical sensor displacement (μm) | | Optical sensor deformation (μm) | Strain gauges deformation (μm) | Difference (μm) |
|---|---|---|---|---|---|
| | Upper image template | Lower image template | | | |
| 15 000 | 17.45 | 11.73 | 5.72 | 5.77 | 0.05 |
| 20 000 | 25.01 | 16.66 | 8.35 | 8.42 | 0.07 |
| 25 000 | 31.96 | 20.88 | 11.08 | 10.92 | 0.16 |
| 30 000 | 38.58 | 25.26 | 13.32 | 13.39 | 0.07 |
| 35 000 | 45.32 | 29.54 | 15.78 | 15.75 | 0.03 |
| 40 000 | 51.60 | 33.64 | 17.96 | 17.96 | 0 |
| 45 000 | 57.58 | 37.34 | 20.24 | 20.18 | 0.06 |
| 50 000 | 63.36 | 41.01 | 22.35 | 22.30 | 0.05 |
| 55 000 | 68.91 | 44.68 | 24.23 | 24.38 | 0.15 |

Table I shows the displacements of the templates in the upper and the lower images or photographs as a function of the applied load, and the relative separation calculated by subtracting the displacement of the lower template from that of the upper template. As can be seen, the deformation values obtained with the optical strain sensor of the present invention agree very well with the deformations as measured with the electrical strain gauge, and the deviations are well within the ASTM D-3148-86 standard.

FIG. 3 shows the absolute displacement of the two templates as a function of the load, as well as the net values and the values as measured with the electrical strain gauge. It will be noted that both, the upper and the lower image templates are displaced in one direction, though at different rates, instead of being displaced in opposing directions. The reason is that, while the applied load caused the sample to contract, it also caused the displacement of the entire sample in the direction of the applied load.

The above test demonstrates the viability of using the present strain sensor and method to determine microdeformations of materials with an accuracy that meets ASTM standards for the determination of the modulus of elasticity of rock materials. The technique could therefore be used in instrumentation for any measurement of deformation where high accuracy is required, for example, the determination of stresses in rock formations and civil engineering structures, nondestructive determination of mechanical properties of materials, monitoring of long term stability of structures, etc. The present optical strain sensor measures deformations without contacting the surface and can deliver objective data not open to subjective interpretation.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. An optical strain sensor for the non-contact measurement of microdeformations of a surface, comprising:
   a camera for taking first and second photographs of respective first and second images of respective first and second areas of the surface before deformation has occurred, the first and second images being separated from each other by a known fixed distance, and for taking third and fourth photographs, respectively of said first and second images after deformation has occurred;
   optical means disposed adjacent to the end of the objective of the camera for causing the camera to photograph the first and second images as separate images or at least one simultaneous split image;
   computing means coupled to the camera for digitizing and storing each photograph, the computing means
   i) selecting at least one template on each of the first and second photograph
   ii) computing a distance between the selected templates;
   iii) searching for the selected templates on the third and fourth photographs;
   iv) computing a distance between the templates found in step (iii); and
   v) deriving the deformation by subtracting the distance obtained in step (iv) from the distance obtained in step (ii) and dividing the difference in distance by the distance between the templates obtained in step (ii).

2. A sensor according to claim 1 wherein the optical means comprises an arrangement of mirrors, lenses, or one or more prisms.

3. A sensor according to claim 1 wherein the optical means causes the camera to photograph at least two separate sequential full resolution images or at least one simultaneous split image.

4. A sensor according to claim 1 wherein the camera further comprises magnifying lenses to increase the resolution.

5. A sensor according to claim 1 further comprising means of adjusting the focal length for the camera.

6. A sensor according to claim 1 wherein the computing means stores the photographs in graphics file format.

7. A sensor according to claim 1 wherein the templates are stored as a distinct sequence of relative grey scales.

8. A sensor according to claim 2 wherein camera resolution is at least 0.2 microns.

9. A sensor according to claim 1, wherein said computing means outputs a strain signal having a resolution of less than about 20 microstrains.

10. A sensor according to claim 1, wherein said selecting step is performed on a display means utilizing interactive image analysis software.

11. An optical strain sensor for the non-contact measurement of microdeformations of a surface comprising:
    at least two cameras installed at a fixed distance from each other for taking first and second photographs of respective first and second areas of the surface, said first and second areas being separated by a known fixed distance from each other before deformation has occurred, said two cameras taking respective third and fourth photographs of said first and second areas after deformation has occurred;
    computing means coupled to the cameras for digitizing and storing each photograph, the computing means
    i) randomly selecting at least one template on each of the first and second photographs;
    ii) computing the distance between the selected templates;
    iii) searching for the selected templates on the third and fourth photographs;
    iv) computing the distance between the templates found in step (iii); and
    v) deriving the deformation by subtracting the distance obtained in step (iv) from the distance obtained in step (ii) and dividing the difference in distance by the distance between the templates obtained in step (ii).

12. A sensor according to claim 9 further comprising an arrangement of mirrors, lenses, or one or more prisms adjacent the end of the objective of each camera.

13. A sensor according to claim 11 wherein each camera further comprises magnifying lenses to increase the resolution.

14. A sensor according to claim 11 further comprising means for adjusting the focal length for each camera.

15. A sensor according to claim 11 wherein the computing means stores the photographs in graphics file format.

16. A sensor according to claim 11 wherein the templates are stored as a distinct sequence of relative grey scales.

17. A sensor according to claim 12 wherein camera resolution is at least 0.2 microns.

18. A sensor according to claim 11, wherein said computing means outputs a strain signal having a resolution of less than about 20 microstrains.

19. A sensor according to claim 11, wherein said selecting step is performed on a display means utilizing interactive image analysis software.

20. A non-contact method for the measurement of microdeformations on a surface, said measurement having a resolution of at least 0.2 microns, the method comprising the steps of:
    a) obtaining, with at least one camera first and second photographs of respective first and second images or at least first and second portions of one split image of respective first and second areas of the surface, the first and second images or portions being separated by a known fixed distance from each other before deformation of the surface occurs;
    b) digitizing and storing the first and second photographs in a computer;
    c) repeating step a) after deformation of the surface has occurred to obtain respective third and fourth photographs of the first and second images;

d) selecting a template on each of the first and second photographs;

e) computing the distance between the templates selected in step (d);

f) searching for the selected templates on the third and fourth photographs;

g) computing the distance between the templates found in step (f); and h) deriving the deformation of the surface by subtracting the distance obtained in step (g) from the distance obtained in step (c) and dividing the difference in distance by the distance between the templates obtained in step (e).

21. A method according to claim 20 wherein the photographs are stored in graphics file format.

22. A method according to claim 20 wherein the templates are stored as distinct sequence of relative grey scales.

23. A method according to claim 20, further comprising the step of outputting a strain signal having a resolution of less than about 20 microstrains.

24. A method according to claim 20, wherein said selecting step is performed on a display means utilizing interactive image analysis software.

* * * * *